INVENTOR
CHARLES E. WINSLOW, JR.
BY John Gibson Semmes
ATTORNEY

Nov. 20, 1962    C. E. WINSLOW, JR    3,064,680
APPARATUS FOR INTRODUCTION OF FLUID
Filed July 19, 1961    4 Sheets-Sheet 2

INVENTOR
CHARLES E. WINSLOW, JR.
BY John Gibson Semmes
ATTORNEY

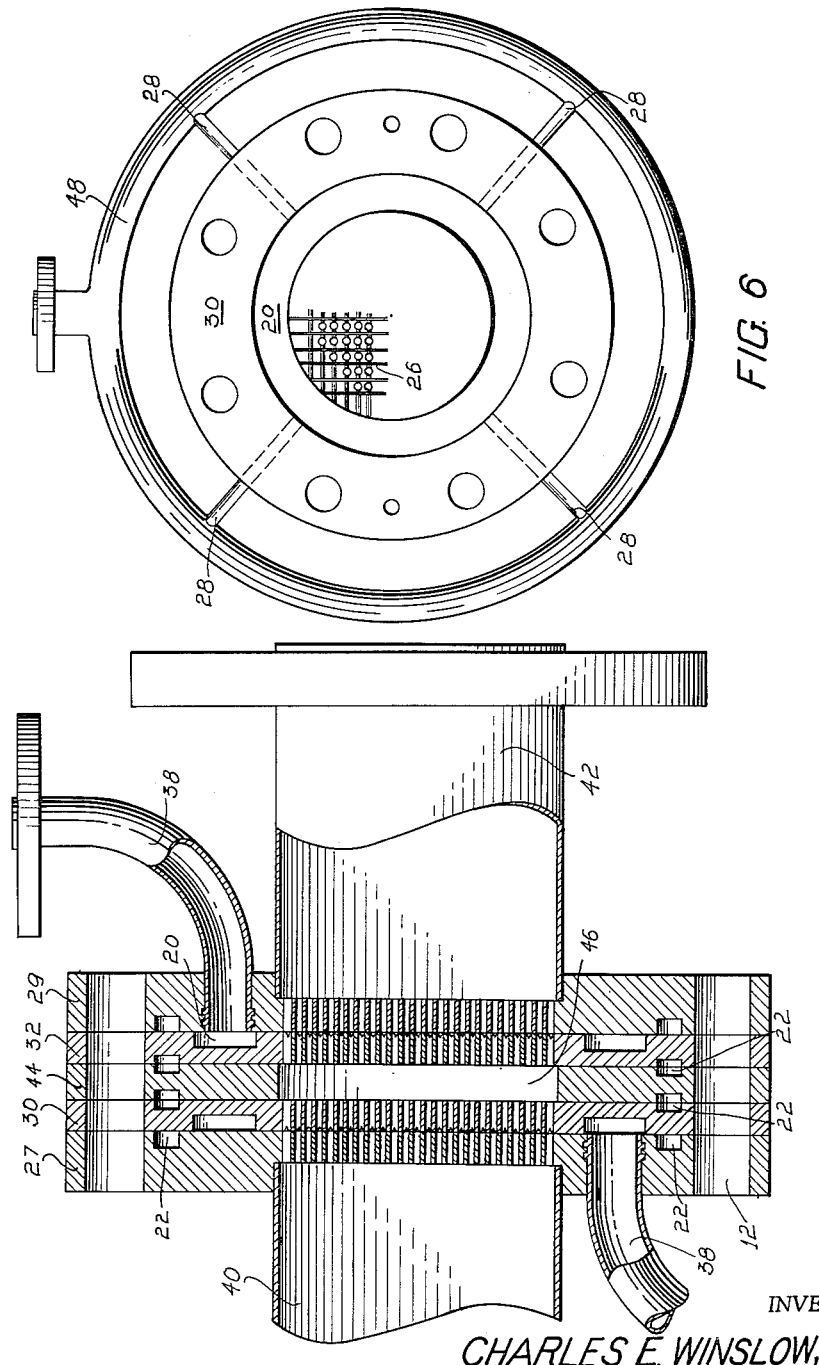

United States Patent Office 3,064,680
Patented Nov. 20, 1962

3,064,680
APPARATUS FOR INTRODUCTION OF FLUID
Charles E. Winslow, Jr., Portsmouth, Va., assignor to Virginia Chemicals & Smelting Company, Norfolk, Va., a corporation of Maine
Filed July 19, 1961, Ser. No. 125,186
10 Claims. (Cl. 137—604)

The present invention relates to apparatus for introducing one fluid to another, particularly means for introducing a reactant fluid through the full cross-section of a flowing stream of circulating fluid.

It often occurs that two or more fluids must be almost instantaneously reacted in exact proportions to obtain a particular product without extensive secondary reactions. Conventional mixers of various types are ineffective in accomplishing mixing of the reactants in proper proportions. As a result, reactions between the reactants then often occur before proper distribution can take place and result in production of undesirable materials. The present apparatus overcomes this difficulty by uniformly distributing the reactants throughout the cross section of a main flow liquid. Thus, the reactants first appear in the reaction zone in perfect proportion to one another and there are eliminated the undesirable reactions caused by improper reactant ratio.

Introduction of a reactant liquid or gas to the main flow of liquid is accomplished through a perforated "sandwich" interposed in the main stream. One half of the sandwich consists of a planar plate i.e., flat on both faces having medial perforations. The second half of the sandwich consists of a second plate abutting said first plate and having medial perforations in registry with the perforations of said first plate. An annular groove in said second plate extends about the area of perforations and is communicant with a reactant fluid supply passage. Cross channels extend inwardly from said annular channel in between the medial perforations of said second plate and V-shaped notches intersecting said cross channels extend from said cross channels to each of said perforations. Thus, reactant fluid is introduced in precise quantities throughout the cross section of the flowing stream.

Accordingly, it is an object of invention to provide apparatus for introduction of one or more fluid reactants to fluid.

Another object of invention is to provide apparatus for uniformly introducing fluid reactants throughout the cross section of a main flow of fluid.

Figure 1:
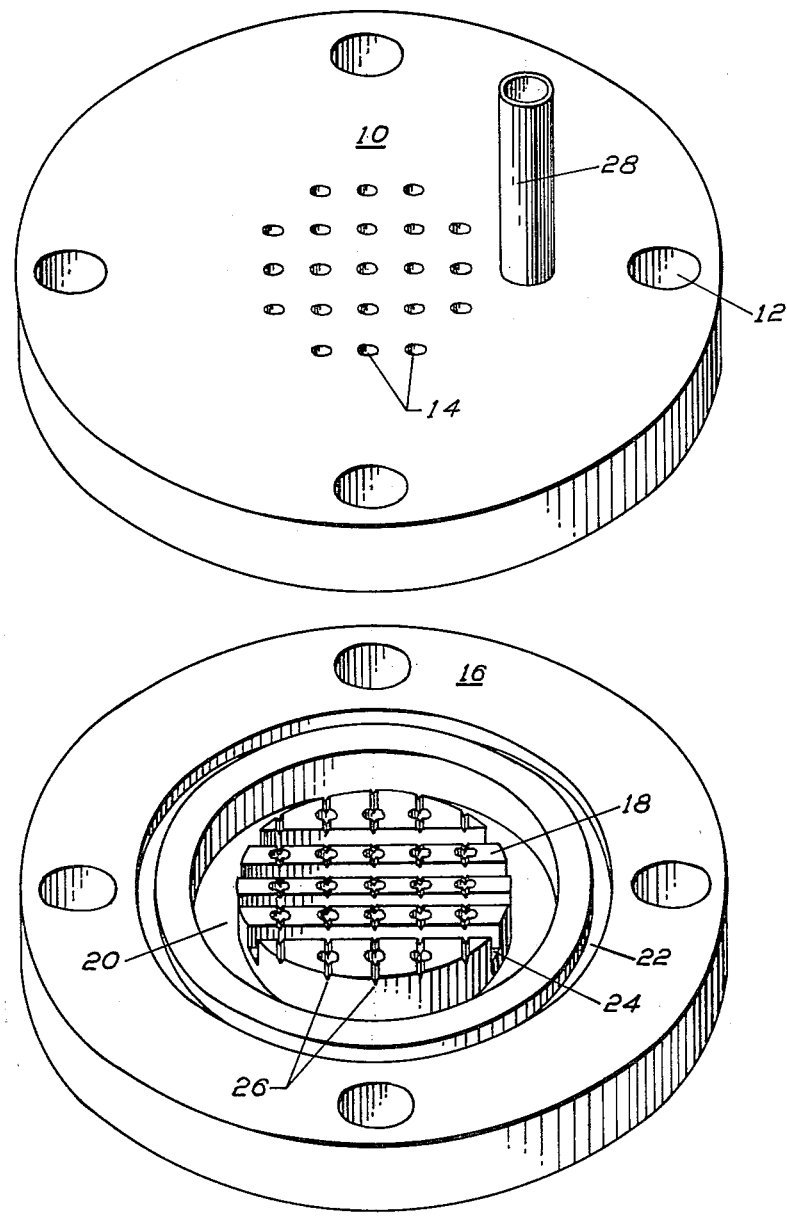

Yet, additional objects will become apparent from the ensuing specification and attached drawings, wherein:

FIG. 1 is an exploded perspective of one form of "sandwich" wherein a planar first plate having medial perforations is abutted with a second plate having perforations in registry therewith and embodying an annular groove about said perforations, a series of cross channels leading from said annular groove and notches intersecting said cross channels and extending to said perforations.

Figure 2:
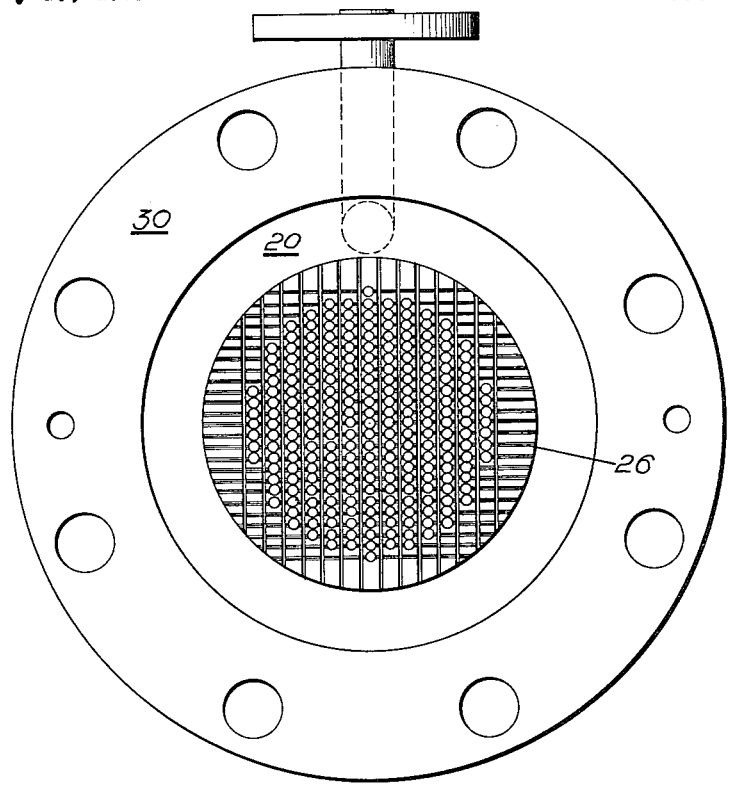
Figure 3:
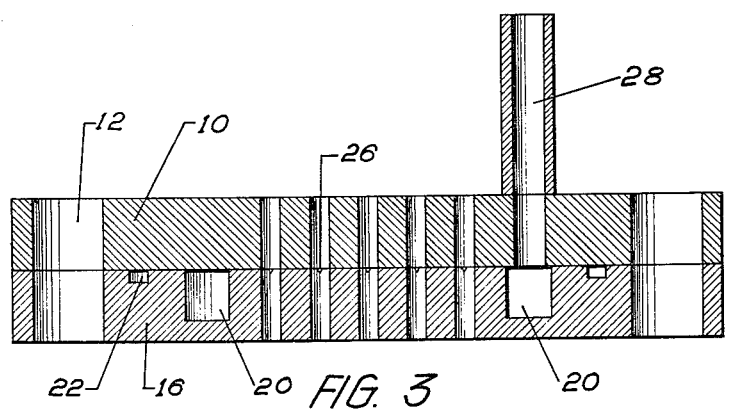
Figure 4:
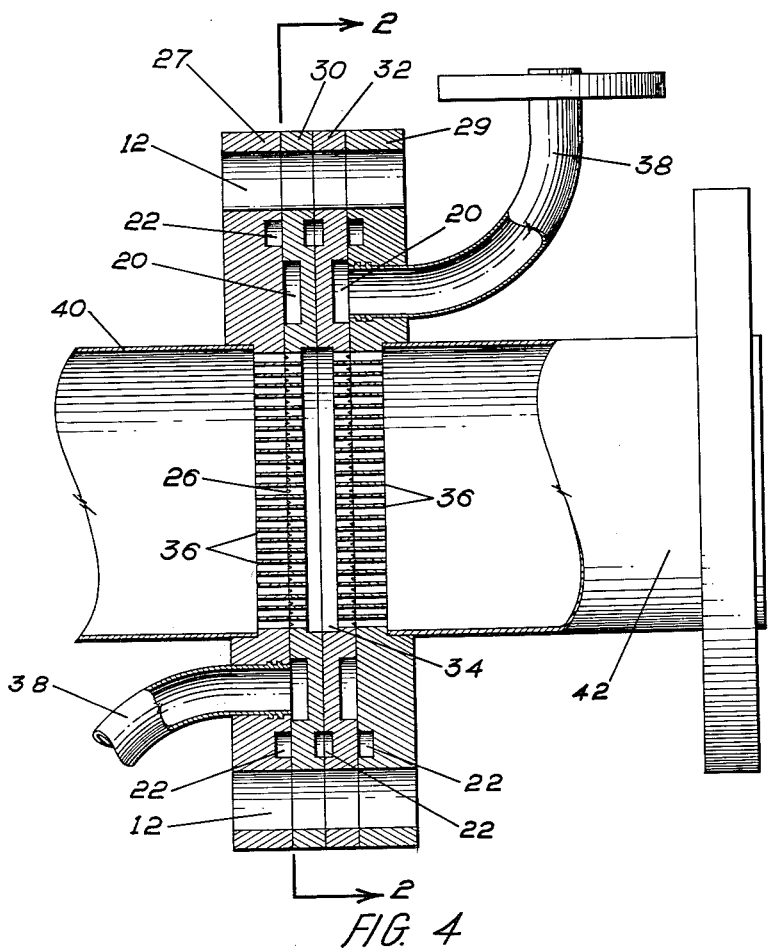

FIG. 2 is a top plan view taken along section line 2—2 of FIG. 4 and showing the employment of cross channels and V-shaped notches in the lower half of a sandwich plate, FIG. 3 is a transverse cross-section of both plates of FIG. 1 in an assembled condition, FIG. 4 is a side elevation, partially in cross section, showing two "sandwiches" fixed together for the introduction of two fluid reactants throughout the cross section of a main flow of fluid.

FIG. 5 is a transverse section of a modified form of invention wherein the assembled plates are provided with a blank plate having a medial aperture, and FIG. 6 is a top plan view of a modified form of invention wherein yoke means are provided to introduce reactant fluids to three or more pairs of plates.

In FIG. 1 top plate 10 is shown as embodying medial perforations 14 and having inwardly of its periphery bolt holes 12. Reactant fluid supply channel 28 extends through top plate 10 so as to communicate with annular groove 20 in bottom plate 16. The isolated perforated area 18 in bottom plate 16 embodies perforations 14 in registry with those of top plate 10 and cross channels 24 intersecting annular groove 20 and extending between the rows of perforations 14. Notches 26 intersecting cross channels 24 as well as annular channel 20, extend to each of said perforations. As will be apparent reactant fluid introduced through supply channel 28 passes into annular groove 20 thence cross channel 24, notches 26 and is introduced into the main flow by means of perforations 14. An O-ring gasket may be seated in groove 22 between plate 16 in order to provide for fluid tight positioning together of plates 10 and 16.

In FIG. 4, two "sandwiches" are interposed in a fluid main flow confined to coaxially aligned pipes 40 and 42, so as to provide apparatus for introduction of two reactant fluids through like fluid supply channels 38. Planar top plate 27 embodies medial perforations 36. Second plate 30 embodies similar medial perforations, cross channels, such as corresponding to cross channels 24 of FIG. 1, leading from annular groove 20 about said perforations, and notches 26 leading from cross channels 24 to each of the individual perforations 36. Plate 30 embodies also a medially recessed portion 34 corresponding circumferentially to the area of perforations in said plate. Third plate 32 is identical in construction with plate 30 and also embodies a medial recesed portion 34 corresponding to the area of perforation so that the abutting plates 30 and 32 define a medial open section which allows for redistribution of the circulating fluid prior to entering the new series of perforations 36 in the next sandwich section comprised of plates 32 and 29. Bottom or fourth plate 29 is identical in construction to plate 27. Fluid supply channels 38 extend respectively through plates 27 and 29 so as to communicate with the respective annular grooves 20. The various plates may be secured together by bolts extending through peripheral bolt holes 12 and sealed in fluid tight relationship by O-ring means 22.

The design of general uniform addition apparatus is presented in FIG. 1. However, the various dimensions must be calculated for each application. In general, the primary fluid must be in pipe of such cross-section that the flow is turbulent. The perforations should be small in size, but sufficient in number so that no excessive pressure drop is caused by the apparatus. The annular groove and cross channels should present only a nominal resistance to flow of the additive reactant stream. The inlet notches to each perforation must present an appreciable resistance to flow of the additive so that each perforation will receive an equal amount of additive. In units of large diameter, it is desirable to graduate radially the size of the notches, with those notches having the largest cross section at the center of the perforated area, to insure uniform distribution.

In lieu of employing the medial recessed portions 34 of plates 30 and 32 an extra or "blank" plate 44 illustrated in FIG. 5 having a large medial aperture 46 might be inserted between the respective sandwiches. Where three pairs of sandwiches are utilized to introduce three reactant fluids as illustrated in FIG. 6 it would be necessary for the supply channels to pass through the peripheral edges of the flanges and sacrifice in diameter of these passages due to the shallowness of the plates may be overcome by employing for each sandwich a plurality of supply passages 28 communicant with a yoke means 48 presented outwardly of the sandwich and extending to a fluid reactant supply source.

Manifestly, numerous modifications in the mode of presentation of the plates one to the other, as well as the mode of feeding reactant fluids to the respective sandwiches may be employed without departing from the spirit and scope of invention, as defined in the subjoined claims.

I claim:
1. Apparatus for introduction of fluid to a main flow of circulating fluid comprising a first perforated plate intersecting said main flow, a second perforated plate interposed in said main flow and abutting said first perforated plate, said second perforated plate having perforations in registry with the perforations of said first plate and embodying an annular groove about the perforated portion of said second plate, cross channels inwardly intersecting said annular groove and extending through said perforated portion, shallow notches intersecting said transverse channels within said perforated portion and extending from said transverse channels to each of said perforations, and at least one fluid supply passage leading to said annular channel.

2. Apparatus as in claim 1, including means of sealing said plates in fluid tight abutment.

3. Apparatus for introduction of fluid reactants to a main flow of circulating fluid comprising a first plate embodying medial perforations and interposed in said main flow, a second perforated plate embodying medial perforations and interposed in said main flow so that perforations of said first and second plates are in registry, said second perforated plate embodying an annular groove about the perforated portion of said second plate, at least one cross channel extending inwardly from said annular groove and through said perforated portions, V-shaped notches intersecting said inwardly extending cross channel within said perforated portion and extending from said cross channel to each of said perforations, and a fluid reactant supply passage leading to said annular channel.

4. An apparatus as in claim 3 wherein said fluid supply passage extends through said first plate.

5. Apparatus as in claim 3 wherein more than one pair of first and second perforated plates are interposed in series in said main flow.

6. Apparatus as in claim 5, wherein said fluid supply passage extends radially inward of said second perforated plate.

7. Apparatus for introduction of fluid reactants to a main flow of circulating fluid comprising a first plate having medial perforations interposed in said main flow so that said perforations are presented substantially throughout the cross section of said main flow, a second perforated plate abutting said first plate so that its perforations are in registry therewith and embodying an annular groove extending about the area of said perforations, said second plate having a plurality of cross channels extending inwardly of said annular groove and between said perforations and notches extending from said cross channels to each of said perforations, said second perforated plate embodying at its bottom a medially recessed portion corresponding circumferentially to the area of said perforations, a third perforated plate interposed in said main flow and abutting said second perforated plate so that said perforations are in registry, said third plate having an annular groove about said perforations, cross channels leading from said annular groove in between said perforations, notches leading from said cross channels to each of said perforations and a medially recessed portion corresponding to the area of said perforation and oppositely presented with respect to the medially recessed portion of said second plate so as to define in between said plates an open redistribution section for fluid, a fourth plate having a medially perforated area and interposed in said main flow so that its perforations are in registry with the perforations of said third plate, fluid reactant supply passage means extending through said first plate into the annular groove of said second plate, fluid reactant supply passage extending through said fourth plate and into the annular groove of said third plate, and means securing said plates together in fluid tight relationship.

8. Apparatus as in claim 7, wherein said annular groove and said cross channels are configured to present nominal resistance to flow of fluid reactants and said notches are configured to present an appreciable resistance to flow of said fluid reactants.

9. Apparatus as in claim 8, wherein at least two notches lead from said cross channels to each of said perforations.

10. Apparatus as in claim 9, wherein said notches are radially graduated in size, the largest notches extending to perforations at the center of the perforated areas and the smallest notches extending to perforations at the periphery of said perforated area.

References Cited in the file of this patent

UNITED STATES PATENTS

| | | |
|---|---|---|
| 1,382,285 | Harris | June 21, 1921 |
| 2,247,310 | Rockwood | June 24, 1941 |
| 2,812,212 | Rogers | Nov. 5, 1957 |

FOREIGN PATENTS

| | | |
|---|---|---|
| 292,404 | Switzerland | Nov. 2, 1953 |
| 318,061 | Great Britain | Aug. 29, 1929 |